United States Patent
Hung

(10) Patent No.: US 6,186,054 B1
(45) Date of Patent: Feb. 13, 2001

(54) ROASTER

(75) Inventor: Yu-China Hung, Tainan (TW)

(73) Assignee: Eucore Enterprises Co., Ltd., Tainan (TW)

( * ) Notice: Under 35 U.S.C. 154(b), the term of this patent shall be extended for 0 days.

(21) Appl. No.: 09/639,077

(22) Filed: Aug. 16, 2000

(51) Int. Cl.$^7$ .............................. A47J 37/00; A47J 37/04; A47J 37/07

(52) U.S. Cl. ............................ 99/339; 99/340; 99/400; 99/421 H; 99/444; 99/446; 99/448

(58) Field of Search ..................... 99/339–341, 419–421, 99/400, 401, 444–450, 476, 481, 482; 126/25 R, 9 R, 41 R; 219/400, 401, 403, 404, 386; 426/523, 466

(56) References Cited

U.S. PATENT DOCUMENTS

| | | | |
|---|---|---|---|
| 3,126,814 | * 3/1964 | Brown | 99/421 H |
| 4,982,657 | * 1/1991 | Ghenic | 99/419 X |
| 5,172,628 | * 12/1992 | Pillsbury et al. | 99/421 A |
| 5,184,540 | * 2/1993 | Riccio | 126/25 R |
| 5,361,686 | * 11/1994 | Koopman | 99/446 X |
| 5,367,950 | * 11/1994 | Sarich | 99/449 X |
| 5,421,318 | * 6/1995 | Unruh et al. | 126/9 R |
| 5,485,780 | * 1/1996 | Koether et al. | 219/400 X |
| 5,562,022 | * 10/1996 | Schmid et al. | 99/419 X |
| 5,715,744 | * 2/1998 | Coutant | 99/421 R |
| 5,799,569 | * 9/1998 | Moreth | 99/446 X |
| 5,819,639 | * 10/1998 | Spell | 99/419 X |
| 5,887,513 | * 3/1999 | Fielding et al. | 99/421 H |

* cited by examiner

Primary Examiner—Timothy F. Simone

(57) ABSTRACT

The roaster includes two handles disposed at both sides of an upper portion of the roaster, two opposite racks respectively fixed at a front end and a rear end of the two handles, electric heating tubes arranged between the two handles, an oil-gathering pan located in a lower portion of the roaster, a guide tube disposed in an inner sidewall of the roaster and extending from an inner sidewall of one of the two handles to the oil-gathering pan, and a grill pan which is located on a top end of the roaster and of which bottom is connected with the guide tube so that excess oil and sauce remained in the grill pan will be guided through the guide tube into the oil-gathering pan, by which the grill pan is capable of being placed above and across the opposite racks of the two handles and being fixed at corresponding locations for grilling meat so as to fully using the inner and outer spaces of the roaster for achieving the multi-function of roasting and grilling in one roaster and saving electricity.

1 Claim, 4 Drawing Sheets

ROASTER

BACKGROUND OF THE INVENTION

This invention relates to a roaster, particularly to a roaster having a grill pan placed on a top end of the roaster, an oil-gathering pan disposed in a lower portion of the roaster and a guide tube located below the grill pan. With the guiding of the guide tube, excess oil coming from an article to be grilled firstly is accommodated in the grill pan and then is accumulated in the oil-gathering pan, which makes the grill pan and the roaster easy to clean. Moreover, the roasting in the roaster and the grilling on the grill pan at the same time is capable of fully using the inner and outer spaces of the roaster for saving electricity and achieving the multi-function of roasting and grilling in one roaster.

A known conventional roaster oven 1 as shown in FIG. 1, includes a cooking tray 10 and electric heating tubes 11 arranged in the interior of the roaster oven 1. Under the heating of the electric heating tubes 11, food to be broiled is heated on the cooking tray 10. However, excess oil coming from the food and the sauce spread on the surface of the food are dropped and remained in the cooking tray 10 and become scorched under further broiling, which is sure to have great influence on the broiling quality of the food and make the cooking tray 10 difficult to be cleaned. Moreover, a further disadvantage of the conventional roaster oven 1 is that only the inner space, not including the outer space, can be utilized for broiling, which is unable to save electricity.

SUMMARY OF THE INVENTION

The main purpose of the invention is to offer a roaster capable of grilling meat and roasting an article at the same time and easy to keep a grill The main feature of the invention is that two handles disposed at both sides of an upper portion of the roaster, two opposite racks respectively fixed at a front end and a rear end of the two handles, electric heating tubes arranged between the two handles, an oil-gathering pan located in a lower portion of the roaster, a guide tube disposed in an inner sidewall of the roaster and extending from an inner sidewall of one of the two handles to the oil-gathering pan, and a grill pan which is located on a top end of the roaster and of which bottom is connected with the guide tube so that excess oil and sauce remained in the grill pan will be guided through the guide tube into the oil-gathering pan.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
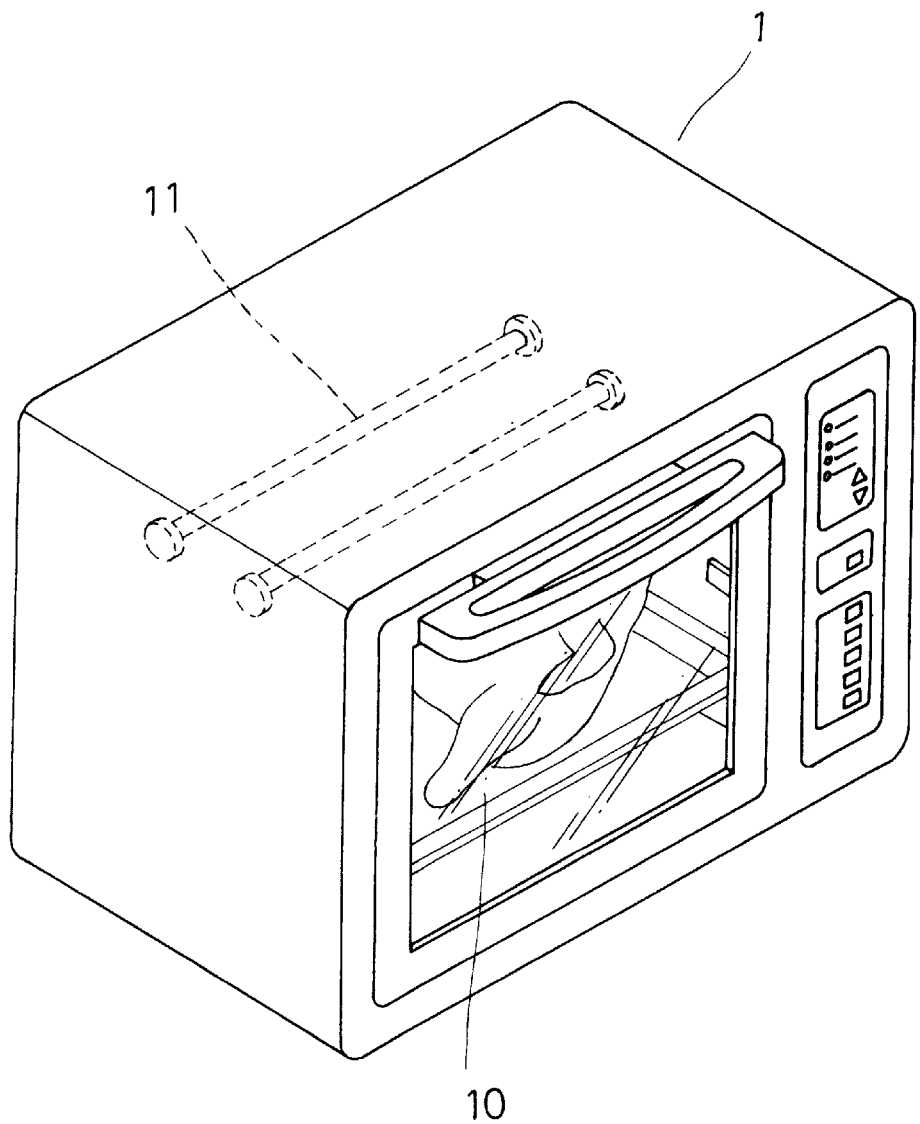
FIG. 1 is a perspective view of a known conventional oven.
Figure 2:
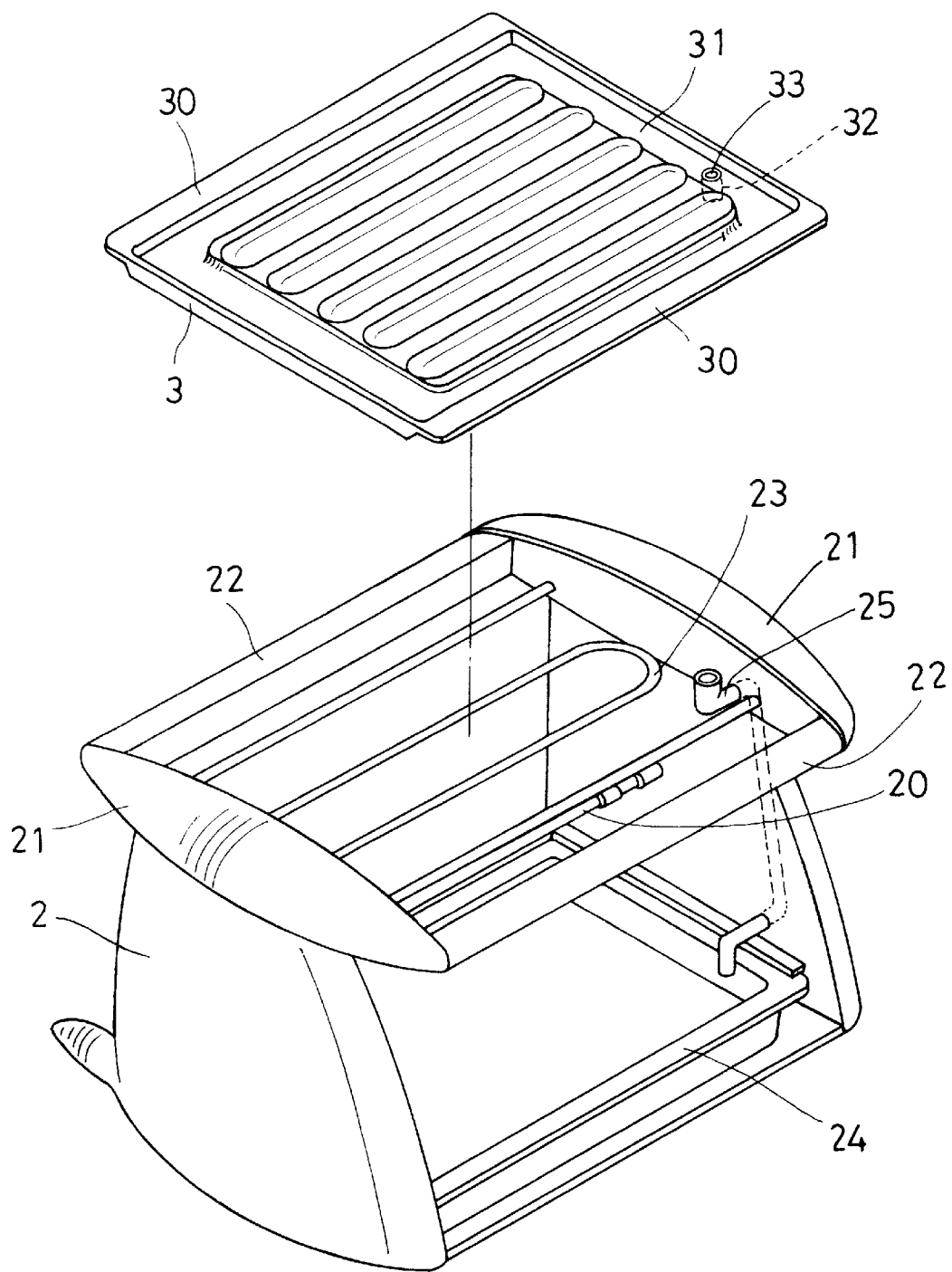
FIG. 2 is an exploded perspective view of a roaster with a grill pan in the present invention.

A preferred embodiment of a roaster 2 in the present invention, as shown in FIG. 2, includes a rotary shaft 20, two handles 21 disposed at both sides of an upper portion of the roaster, two opposite racks 22 respectively fixed at a front end and a rear end of the two handles 21, electric heating tubes 23 arranged between the two handles 21, an oil-gathering pan 24 located in a lower portion of the roaster 2, a guide tube 25 disposed in an inner sidewall of the roaster 2 and extending from an inner sidewall of one of the two handles 21 to the oil-gathering pan 24, and a grill pan 3.

The grill pan 3 placed on a top end of the roaster 2 is combined with a front and a rear flanges 30 respectively located at both ends of the grill pan 3, a circumferential oil-gathering recess 31 disposed around an inner sidewall of the grill pan 3, a post 32 located under the bottom of the grill pan 3, and a through hole 33 intercommunicated with the circumferential oil-gathering recess 31 and the post 32.

Figure 3:
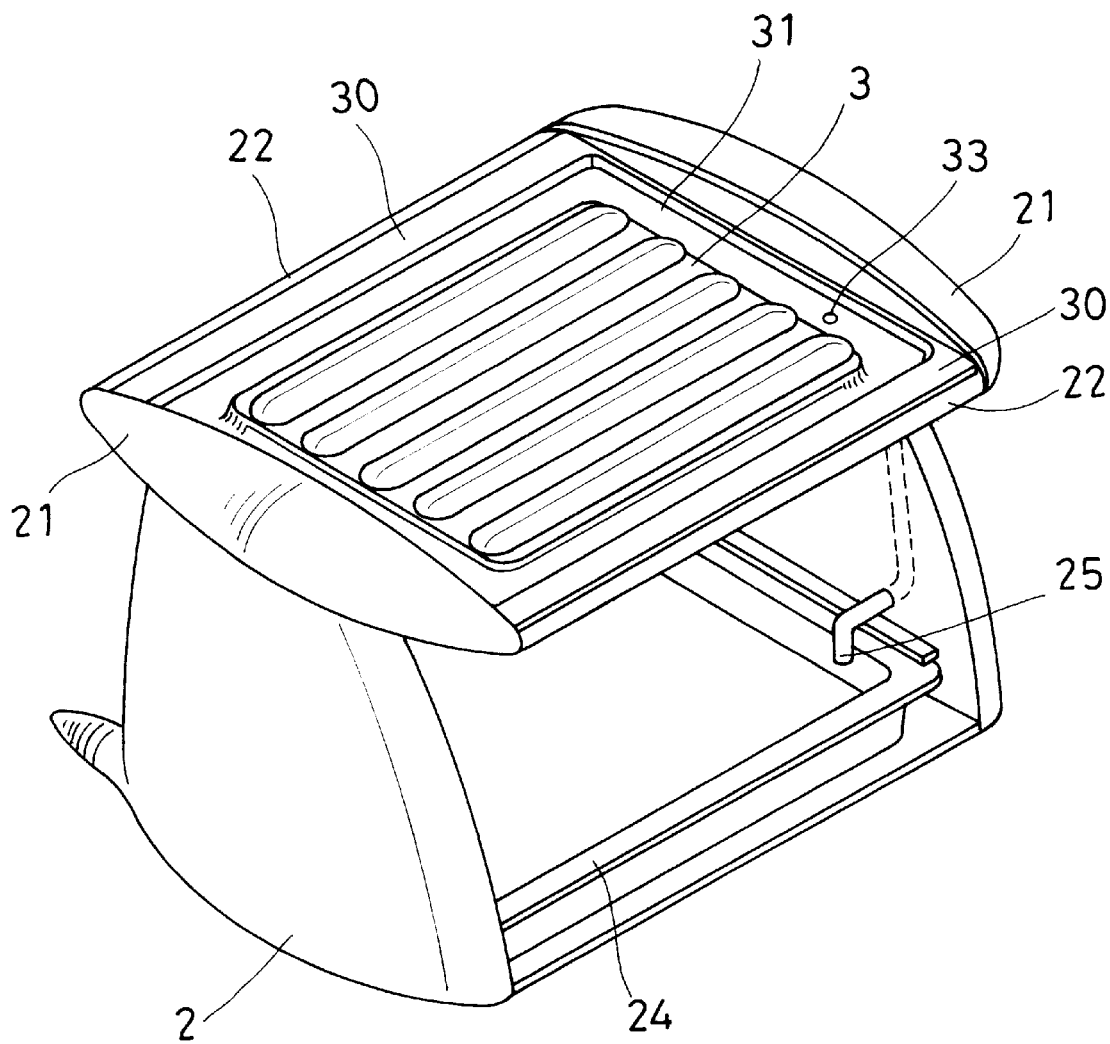
FIG. 3 is a perspective view of the roaster combined with a grill pan in the present invention; and, FIG. 4 is a side cross-sectional view of the roaster combined with a grill pan and being used in the present invention.
Figure 4:
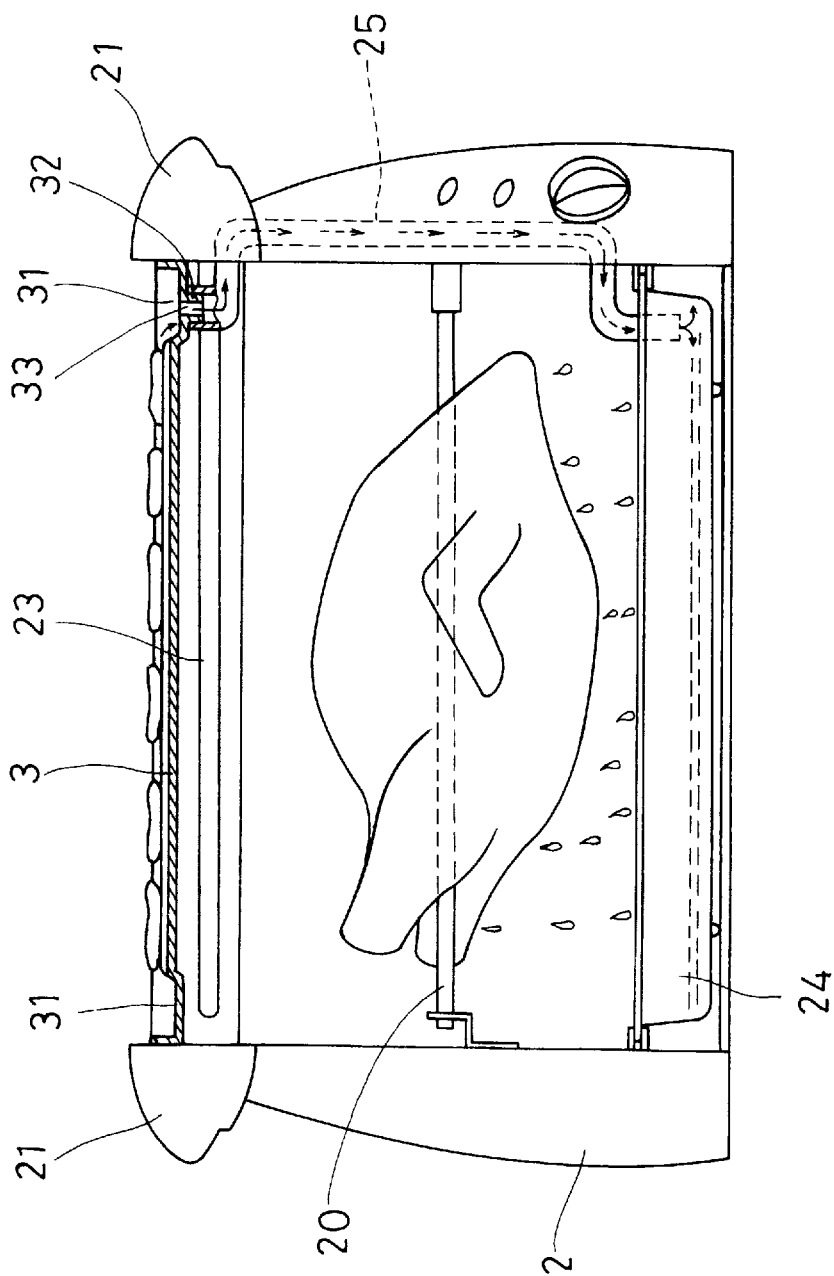

In assembling, referring to FIGS. 2, 3 and 4, firstly the grill pan 3 is placed above the two handles 21 with the font and rear flanges 30 crossed the opposite racks 22 and fixed at corresponding locations. And then, the post 32 is inserted into an upper end of the guide tube 25, finishing assemblage of the grill pan 3.

In using the roaster 2, referring to FIG. 4, a larger article to be roasted such as a whole chicken protruded through and supported by the rotary shaft 20 will be roasted evenly in every part under the incessantly rotation of the rotary shaft 20. At the same time, the grill pan 3 having placed above the roaster 2 is also capable of grilling meat. As shown in FIG. 4, the oil coming out of the article roasted in the roaster 2 will directly drop down into the oil-gathering pan 24 without smudging the interior of the roaster 2. However, the oil coming from the meat and the sauce spread on the surface of the meat of the grill pan 3 are accommodated in the circumferential oil-gathering recess 31, pass the through hole 33, and then flow into the oil-gathering pan 24 in the lower portion of the roaster 2 under the guiding of the guide tube 25, which the oil and sauce will not accumulate in the grill pan 3 so that the grill pan 3 is very easy to clean. When grilling, the grill pan 3 is capable of keeping the meat delicious without the scorched oil and sauce. Moreover, the roasting in the roaster 2 and the grilling on the grill pan 3 at the same time is capable of fully using the inner and outer spaces of the roaster 2, saving electricity and achieving the multi-function of roasting and grilling in one roaster.

While the preferred embodiment of the invention has been described above, it will be recognized and understood that various modifications may be made therein and the appended claims are intended to cover all such modifications that may fall within the spirit and scope of the invention.

What is claimed is:

1. A roaster comprising:

two handles disposed at both sides of an upper portion of said roaster;

two opposite racks respectively fixed at a front end and a rear end of said two handles;

electric heating tubes arranged between said two handles;

an oil-gathering pan located in a lower portion of said roaster;

a guide tube disposed in an inner sidewall of said roaster and extending from an inner sidewall of one of said two handles to said oil-gathering pan; and, a grill pan which is located on a top end of said roaster and of which bottom is connected with said guide tube so that excess oil and sauce remained in said grill pan will be guided through said guide tube into said oil-gathering pan; whereby said grill pan capable of being placed above and across said opposite racks of said two handles and being fixed at corresponding locations for grilling meat so as to fully using the inner and outer spaces of said roaster for achieving the multi-function of roasting and grilling in one roaster and saving electricity.

* * * * *